(12) United States Patent
Colarusso et al.

(10) Patent No.: US 12,274,973 B2
(45) Date of Patent: Apr. 15, 2025

(54) METHODS FOR EVALUATING VAPOR PUMP PERFORMANCE

(71) Applicant: W. L. Gore & Associates, Inc., Newark, DE (US)

(72) Inventors: John P. Colarusso, Lincoln University, PA (US); Kyle Doce, Elkton, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 493 days.

(21) Appl. No.: 17/783,977

(22) PCT Filed: Dec. 11, 2019

(86) PCT No.: PCT/US2019/065712
§ 371 (c)(1),
(2) Date: Jun. 9, 2022

(87) PCT Pub. No.: WO2021/118558
PCT Pub. Date: Jun. 17, 2021

(65) Prior Publication Data
US 2023/0020289 A1    Jan. 19, 2023

(51) Int. Cl.
*B01D 53/04* (2006.01)
*B01D 53/26* (2006.01)
*F04B 37/20* (2006.01)

(52) U.S. Cl.
CPC ....... *B01D 53/0446* (2013.01); *B01D 53/263* (2013.01); *F04B 37/20* (2013.01)

(58) Field of Classification Search
CPC .............. B01D 53/0446; B01D 53/263; B01D 53/261; F04B 37/20; F04B 37/10; F04B 37/18
See application file for complete search history.

(56) References Cited

U.S. PATENT DOCUMENTS

| 5,454,258 A | 10/1995 | Capuano |
| 6,576,473 B1 | 6/2003 | Scaringe et al. |

(Continued)

FOREIGN PATENT DOCUMENTS

| GB | 1339698 A | 12/1973 |
| RU | 2045037 C1 | 9/1995 |

OTHER PUBLICATIONS

Greenspan, L., et al., "Humidity fixed points of binary saturated aqueous solutions", Journal of Research of the National Bureau of Standards Section A: Physics and Chemistry, vol. 81A, No. 1, Jan. 1, 1977 (Jan. 1, 1977), p. 89, XP055284567.

(Continued)

*Primary Examiner* — Robert Clemente
(74) *Attorney, Agent, or Firm* — Faegre Drinker Biddle & Reath LLP (57) ABSTRACT

Some embodiments of the present disclosure relate to a method that includes disposing a vapor pump partially within an enclosure, such that the vapor pump is in fluid communication with the enclosure and an external environment, and where the enclosure comprises at least one vapor. In some embodiments, a portion of the at least one vapor is transferred with the vapor pump from the enclosure to the external environment. In some embodiments, a change in at least one parameter related to a mass of the at least one vapor within the enclosure is measured. In some embodiments, a rate of the portion of the at least one vapor transferred with the vapor pump from the enclosure to the external environment is calculated. In some embodiments, the rate of the portion of the at least one vapor transferred from the enclosure to the external environment with the vapor pump is calculated based on the change in the at least one parameter.

17 Claims, 4 Drawing Sheets

Salt bath maintains constant RH
Measurements: Temperature/ Humidity in Chamber and Box, Mass of Salt Bath (56) References Cited

U.S. PATENT DOCUMENTS

| | | |
|---|---|---|
| 10,156,372 B2 | 12/2018 | Keough et al. |
| 2008/0047325 A1 | 2/2008 | Bartlett |
| 2013/0055892 A1 | 3/2013 | Spiegelman et al. |
| 2016/0363331 A1 | 12/2016 | Keough et al. |
| 2019/0255482 A1 | 8/2019 | Ball et al. |

OTHER PUBLICATIONS

Hao Guangzong et al., "Saturated Salt Water Solution Humidity Fixed Point (2)—Data Source and Salt Solution Selection," Sensor World, Issue 12, Dec. 31, 1999, pp. 10-14. Machine translation.

International Preliminary Report on Patentability received for PCT Patent Application No. PCT/US2019/065712, mailed on Jun. 23, 2022, 8 pages.

International Search Report and Written Opinion received for PCT Patent Application No. PCT/US2019/065712, mailed on Oct. 6, 2020, 10 pages.

The Engineering Toolbox: "Saturated Salt Solutions and Air Humidity", The Engineering ToolBox, Jun. 18, 2016 (Jun. 18, 2016), XP055732162.

METHODS FOR EVALUATING VAPOR PUMP PERFORMANCE

CROSS-REFERENCE TO RELATED APPLICATION

This application is a national phase application of PCT Application No. PCT/US2019/065712, internationally filed on Dec. 11, 2019, which is herein incorporated by reference in its entirety for all purposes.

FIELD

The present disclosure relates to methods for evaluating performance of vapor pumps, such as moisture pumps.

BACKGROUND

Many items are susceptible to damage caused by excessive vapor or moisture. For instance, electrical and electronic items may be ruined or altered due to excessive vapor or moisture. Similarly, enclosed components, e.g., those contained in a housing, that undergo thermal cycling are susceptible to vapor or moisture related problems. Examples of enclosures which are susceptible to undesirable vapor or moisture include, for example, automotive headlamp units, solar inverters, electronics contained in enclosed housings, and other systems where on/off cycling of a heat source within an enclosure results in vapor or moisture build-up.

Vapor pumps or moisture pumps may be used to eliminate or mitigate the damage caused by this excessive vapor or moisture. However, methods for measuring the performance of such vapor or moisture pumps are needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is the summary intended to be used in isolation to determine the scope of the claimed subject matter. The subject matter should be understood by reference to appropriate portions of the entire specification, any or all drawings, and each claim.

Some embodiments of the present disclosure relate to a method comprising disposing a vapor pump partially within an enclosure, such that the vapor pump is in fluid communication with the enclosure and an external environment, and where the enclosure comprises at least one vapor. In some embodiments, a portion of the at least one vapor is transferred, with the vapor pump, from the enclosure to the external environment. In some embodiments, a change in at least one parameter related to a mass of the at least one vapor within the enclosure is measured. In some embodiments, a rate of the portion of the at least one vapor transferred from the enclosure to the external environment with the vapor pump is calculated. In some embodiments, the rate of the portion of the at least one vapor transferred from the enclosure to the external environment with the vapor pump is calculated based on the change in the at least one parameter.

Some embodiments of the present disclosure relate to method comprising: disposing a moisture pump partially within an enclosure, such that the moisture pump is in fluid communication with the enclosure and an external environment. In some embodiments, the enclosure comprises: water vapor and a supersaturated salt solution. In some embodiments, the method includes transferring, with the moisture pump, a portion of the water vapor from the enclosure to the external environment over at least one time-period. In some embodiments, the method includes measuring a change in mass of the supersaturated salt solution over the at least one time-period. In some embodiments, the method includes calculating a rate of the portion of water vapor transferred from the enclosure to the external environment with the moisture pump over the at least one time-period. In some embodiments, the rate of water vapor transferred with the moisture pump from the enclosure to the external environment is calculated based on the change in mass of the supersaturated salt solution over the at least one time-period.

In some embodiments, at least one pump curve is generated over the at least one time-period.

In some embodiments, non-limiting exemplary methods of the present disclosure are performed at an equilibrium relative humidity in the enclosure and at a constant temperature.

In some embodiments, non-limiting exemplary methods of the present disclosure are performed at an equilibrium relative humidity in the external environment.

In some embodiments, the equilibrium relative humidity of at least one of the enclosure or the external environment ranges from 2% to 98% over a temperature range of 0° C. to 100° C.

In some embodiments, the moisture pump operates continuously.

In some embodiments, the moisture pump operates in cycles.

In some embodiments, non-limiting steps of transferring, with the moisture pump, a portion of the water vapor from the enclosure to the external environment are performed over a plurality of time periods, which may include: for a first time-period: absorbing or adsorbing the portion of water vapor with the moisture pump from within the enclosure, so as to lower the relative humidity of the enclosure below the equilibrium relative humidity, and evaporating water, from the supersaturated salt solution, so as to restore the relative humidity to the equilibrium relative humidity; and for a second time-period: desorbing water vapor, from the moisture pump, into the external environment. In some embodiments, a sum of the first and second time-periods defines a pump cycle.

In some embodiments, the rate of the portion of water vapor transferred from the enclosure to the external environment with the moisture pump is calculated based on the change in mass of the supersaturated salt solution over the pump cycle.

In some embodiments, at least one pump curve is generated over the pump cycle.

In some embodiments, the method is performed at a constant moisture gradient between the enclosure and the external environment.

In some embodiments, the method is performed in intervals at a series of constant moisture gradients between the enclosure and the external environment.

In some embodiments, a plurality of pump curves is generated during the intervals. In some embodiments, each pump curve corresponds to a particular moisture gradient of the series of moisture gradients.

In some embodiments, the constant moisture gradient or series of constant moisture gradients is constant over a range of from 0° C. to 100° C.

In some embodiments, the external environment takes the form of a second enclosure. In some embodiments, the second enclosure is maintained at an equilibrium temperature.

In some embodiments, the at least one salt of the supersaturated salt solution is chosen from: Lithium Bromide, Lithium Chloride, Potassium Carbonate, Potassium Nitrate, Potassium Sulfate, Calcium Chloride, Magnesium Chloride Hexahydrate, Magnesium Nitrate Hexahydrate, Sodium Nitrite, or any combination thereof.

In some embodiments, the at least one salt of the supersaturated salt solution is chosen from: Magnesium Chloride, Cesium Fluoride, Lithium Bromide, Zinc Bromide, Potassium Hydroxide, Sodium Hydroxide, Lithium Chloride, Calcium Bromide Lithium Iodide, Potassium Acetate, Potassium Fluoride, Magnesium Chloride, Sodium Iodide, Potassium Carbonate, Magnesium Nitrate, Sodium Bromide, Cobalt Chloride, Potassium Iodide, Strontium Chloride, Sodium Nitrate, Sodium Chloride, Ammonium Chloride, Potassium Bromide, Ammonium Sulfate, Potassium Chloride, Strontium Nitrate, Potassium Nitrate, Potassium Sulfate, Potassium Chromate, Calcium Chloride, Magnesium Chloride Hexahydrate, Magnesium Nitrate Hexahydrate, Sodium Nitrite, or any combination thereof.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

As defined herein, a "supersaturated solution" is the most concentrated solution possible at a given temperature."

As defined herein, a "supersaturated salt solution" is a "supersaturated solution" in which at least one solute of the supersaturated solution is a salt. In some embodiments, the supersaturated solution includes at least one solvent, where the at least one solvent comprises water. In some embodiments, the water is liquid water.

As used herein, a first container is in "fluid communication" with a second container, if the first container is configured to transport at least one of: a liquid, a gas, or any combination thereof into the second container.

As used herein, a "constant" value is a fixed or unchanging value.

As used herein, an "equilibrium" value is a value that fluctuates around a constant set point. The constant set point is the value that the equilibrium value would take under controlled conditions. Non-limiting examples of controlled conditions include, but are not limited to: constant temperature, constant pressure, constant moisture content, and combinations thereof. For instance, by way of example and without being limiting, a temperature of an enclosure may range from 95° C. to 105° C., depending on environmental conditions. However, if environmental conditions (e.g., temperature, pressure, moisture content, and combinations thereof) were held constant, the enclosure would remain at a constant temperature of 100° C. Thus, in this non-limiting example, the "equilibrium" temperature is 100° C.

As used herein, "moisture" is mixture comprising water and at least one gas. In some embodiments, the at least one gas is air.

As used herein, a "vapor pump" is a pump configured to transport at least one vapor.

As used herein, a "moisture pump" is a species of vapor pump configured to transport moisture.

As used herein, a "heated moisture pump" (also abbreviated herein as an "HMP"), is a species of moisture pump that includes at least one heat source. In some embodiments, the heat source is a heater.

Some embodiments of the present disclosure relate to the evaluation of vapor pump performance.

In some embodiments, a vapor pump is disposed at least partially within at least one enclosure. In some embodiments, a vapor pump is disposed fully within at least one enclosure.

In some embodiments, the vapor pump is a moisture pump. In some embodiments the moisture pump is a heated moisture pump.

Figure 1:
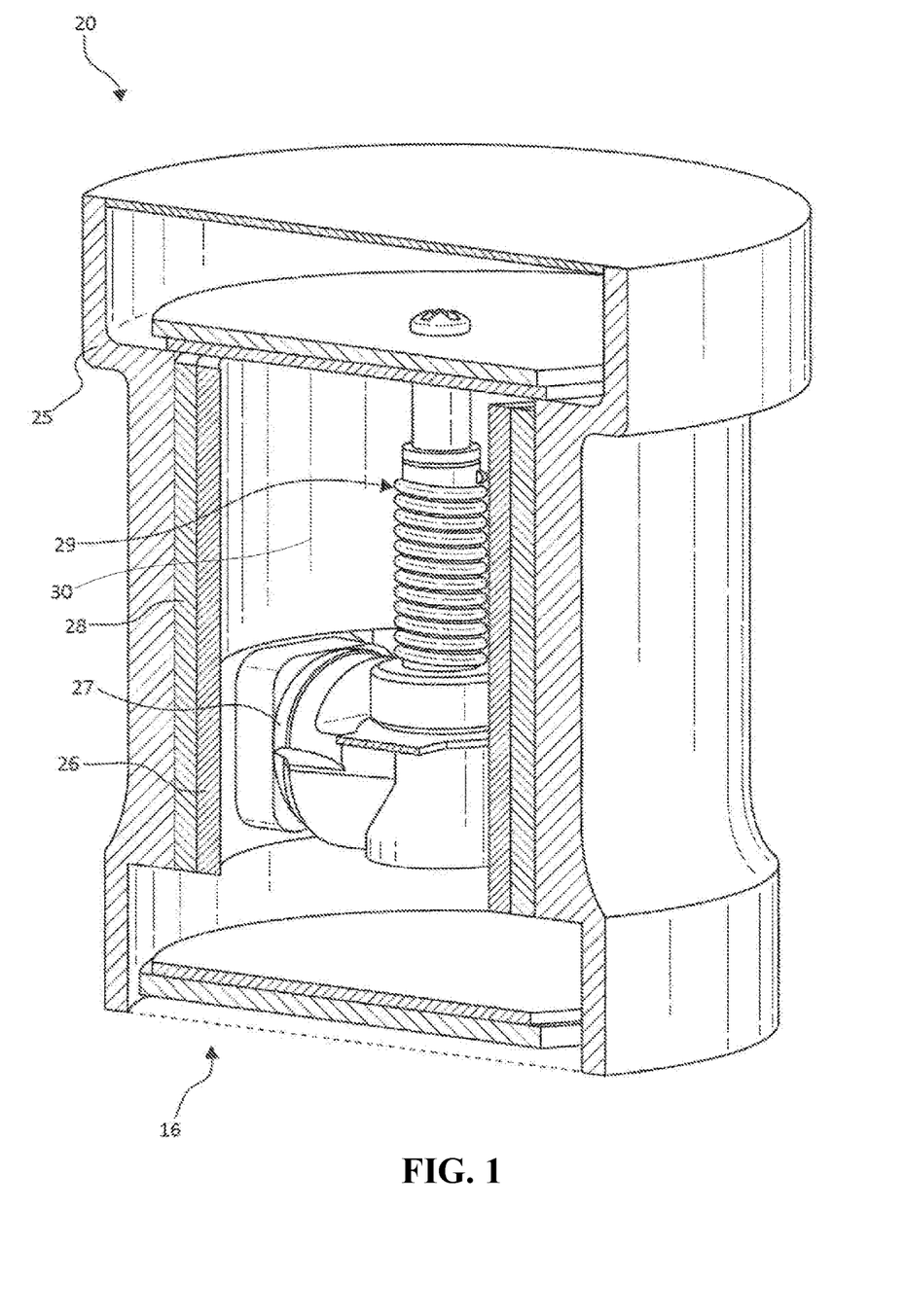
FIG. 1 depicts a non-limiting embodiment of an exemplary vapor pump according to the present disclosure.

A non-limiting exemplary embodiment of a vapor pump according to the present disclosure, in the form of heated moisture pump 20, is shown in FIG. 1. As shown, the heated moisture pump 20 of FIG. 1 includes a housing 25. In some embodiments, the housing 25 defines a heating chamber 30 and a condensation chamber 35. In some embodiments, a desiccant 26, a heater 27, and a heat sink 28 are disposed in the housing 25, as shown. In some embodiments, the heated moisture pump 20 is configured to selectively adsorb moisture from the heating chamber 30 when a heater 27 is off and is configured to desorb moisture from the heating chamber 30 when the heater 27 is on. In some embodiments, a valve assembly 29 is also disposed in the housing 25. In some embodiments, the valve assembly 29 is configured to be transitioned between an adsorption position (not shown) and a desorption position (not shown).

Additional non-limiting examples of vapor pumps according to the present disclosure are described in U.S. Pat. No. 10,156,372 and US Patent Application Publication No. 2019/0255482, each of which are incorporated by reference in their respective entireties.

In some embodiments, the vapor pump is in fluid communication with the enclosure and an external environment. In some embodiments, the enclosure is a box. In some embodiments the enclosure is a box comprising at least one metal. In some embodiments, the at least one metal is steel. In some embodiments, the external environment is a controlled environment. In some embodiments the controlled environment is a laboratory environment. In some embodiments, the external environment is a second enclosure, such that there is a first enclosure and a second enclosure. In some embodiments, the first enclosure and the second enclosure are the same. In some embodiments, the first enclosure and the second enclosure are different.

In some embodiments, at least one of the first enclosure or the external environment comprises at least one vapor that is pumped by the vapor pump. In some embodiments, the at least one vapor comprises water vapor. In some embodiments, the at least one vapor takes the form of a gaseous mixture comprising water vapor and air.

In some embodiments, at least a portion of the at least one vapor is transferred, with the vapor pump, from the enclosure to the external environment. In some embodiments, all of the at least one vapor is transferred, with the vapor pump, from the enclosure to the external environment.

In some embodiments, a change in at least one parameter related to a mass of the at least one vapor within the enclosure is measured over at least one time-period. In some embodiments, a change in at least one parameter related to a mass of the at least one vapor within the enclosure is measured over a plurality of time-periods.

The at least one time-period or plurality of time periods can be any length and may vary based on several factors. In some embodiments, the at least one time-period or plurality of time-periods ranges from 6 to 24 hours. In some embodiments, the at least one time-period or plurality of time periods ranges from 12 to 24 hours. In some embodiments, the at least one time-period or plurality of time-periods ranges from 6 to 12 hours. In some embodiments, the at least one time-period or plurality of time-periods is at least one of 6 hours, 12 hours, or 24 hours.

In some embodiments, the enclosure includes a supersaturated salt solution. In some embodiments, the enclosure includes a supersaturated salt solution comprising: liquid water, and at least one salt in a sufficient concentration to maintain the supersaturated salt solution in a supersaturated state. In such embodiments, the at least one parameter for which a change is measured may include a mass of the supersaturated salt solution. In some embodiments, a rate of the portion of the at least one vapor transferred, with the vapor pump, from the enclosure to the external environment is calculated over the at least one time-period or the plurality of time-periods. In some embodiments, the rate of the portion of the at least one vapor transferred, with the vapor pump, from the enclosure to the external environment is calculated based on the change in at least one parameter over the at least one time-period or the plurality of time-periods. In some embodiments where the at least one parameter includes the mass of the supersaturated salt solution, the change in the at least one parameter may be the change in the mass of the supersaturated salt solution. Put differently, in some embodiments where the at least one parameter includes the mass of the supersaturated salt solution, the rate of water vapor transferred, with the moisture pump, from the enclosure to the external environment may be calculated based on the change in mass of the supersaturated salt solution over the at least one time-period or the plurality of time-periods.

In some embodiments, the supersaturated salt solution takes the form of a supersaturated salt bath. In some embodiments, the enclosure may include a balance, where the balance is configured to measure the change in the mass of the supersaturated salt bath within the enclosure over the at least one time-period or plurality of time-periods.

In some embodiments, the at least one salt of the supersaturated salt solution is chosen from: Lithium Bromide, Lithium Chloride, Potassium Carbonate, Potassium Nitrate, Potassium Sulfate, Calcium Chloride, Magnesium Chloride Hexahydrate, Magnesium Nitrate Hexahydrate, Sodium Nitrite, or any combination thereof. In some embodiments, the at least one salt of the supersaturated salt solution is selected from the group consisting of: Lithium Bromide, Lithium Chloride, Potassium Carbonate, Potassium Nitrate, Potassium Sulfate, Calcium Chloride, Magnesium Chloride Hexahydrate, Magnesium Nitrate Hexahydrate, Sodium Nitrite, and any combination thereof.

In some embodiments, the at least one salt of the supersaturated salt solution is chosen from: Magnesium Chloride, Cesium Fluoride, Lithium Bromide, Zinc Bromide, Potassium Hydroxide, Sodium Hydroxide, Lithium Chloride, Calcium Bromide Lithium Iodide, Potassium Acetate, Potassium Fluoride, Magnesium Chloride, Sodium Iodide, Potassium Carbonate, Magnesium Nitrate, Sodium Bromide, Cobalt Chloride, Potassium Iodide, Strontium Chloride, Sodium Nitrate, Sodium Chloride, Ammonium Chloride, Potassium Bromide, Ammonium Sulfate, Potassium Chloride, Strontium Nitrate, Potassium Nitrate, Potassium Sulfate, Potassium Chromate, Calcium Chloride, Magnesium Chloride Hexahydrate, Magnesium Nitrate Hexahydrate, Sodium Nitrite, or any combination thereof. In some embodiments, the at least one salt of the supersaturated salt solution is selected from the group consisting of: Magnesium Chloride, Cesium Fluoride, Lithium Bromide, Zinc Bromide, Potassium Hydroxide, Sodium Hydroxide, Lithium Chloride, Calcium Bromide Lithium Iodide, Potassium Acetate, Potassium Fluoride, Magnesium Chloride, Sodium Iodide, Potassium Carbonate, Magnesium Nitrate, Sodium Bromide, Cobalt Chloride, Potassium Iodide, Strontium Chloride, Sodium Nitrate, Sodium Chloride, Ammonium Chloride, Potassium Bromide, Ammonium Sulfate, Potassium Chloride, Strontium Nitrate, Potassium Nitrate, Potassium Sulfate, Potassium Chromate, Calcium Chloride, Magnesium Chloride Hexahydrate, Magnesium Nitrate Hexahydrate, Sodium Nitrite, and any combination thereof.

In some embodiments, non-limiting exemplary methods of the present disclosure are performed at an equilibrium relative humidity in at least one of the enclosure, the external environment, or any combination thereof. In some embodiments, non-limiting exemplary methods of the present disclosure are performed at a constant temperature in at least one of the enclosure, the external environment, or any combination thereof.

In some embodiments, where the external environment takes the form of a second enclosure, the second enclosure may be maintained at an equilibrium temperature, a constant pressure, an equilibrium relative humidity or any combination thereof.

In some embodiments, at least one of the enclosure, the external environment, or any combination thereof may include a temperature sensor configured to measure the temperature of at least one of the enclosure, the external environment, or any combination thereof. In some embodiments, at least one of the enclosure, the external environment, or any combination thereof may include a pressure sensor configured to measure the pressure of at least one of the enclosure, the external environment, or any combination thereof. In some embodiments, at least one of the enclosure, the external environment, or any combination thereof may include a humidity sensor configured to measure the humidity of at least one of the enclosure, the external environment, or any combination thereof. In some embodiments, the temperature sensor and humidity sensor may be in the form of a single device, including but not limited to, a temperature—humidity probe.

In some embodiments, where the external environment takes the form of a second enclosure, the second enclosure may include any sensor, probe, or combination thereof described herein.

In some embodiments, the equilibrium relative humidity of at least one of the enclosure or the external environment ranges from 2% to 98% over a temperature range of 0° C. to 100° C. In some embodiments, the equilibrium relative humidity of at least one of the enclosure or the external environment ranges from 5% to 98% over a temperature range of 0° C. to 100° C. In some embodiments, the equilibrium relative humidity of at least one of the enclosure or the external environment ranges from 10% to 98% over a temperature range of 0° C. to 100° C. In some embodiments, the equilibrium relative humidity of at least one of the enclosure or the external environment ranges from 25% to 98% over a temperature range of 0° C. to 100° C. In some embodiments, the equilibrium relative humidity of at least one of the enclosure or the external environment ranges from 50% to 98% over a temperature range of 0° C. to 100° C. In some embodiments, the equilibrium relative humidity of at least one of the enclosure or the external environment ranges from 75% to 98% over a temperature range of 0° C. to 100° C. In some embodiments, the equilibrium relative humidity of at least one of the enclosure or the external environment ranges from 90% to 98% over a temperature range of 0° C. to 100° C.

In some embodiments, the equilibrium relative humidity of at least one of the enclosure or the external environment ranges from 2% to 90% over a temperature range of 0° C. to 100° C. In some embodiments, the equilibrium relative humidity of at least one of the enclosure or the external environment ranges from 2% to 75% over a temperature range of 0° C. to 100° C. In some embodiments, the equilibrium relative humidity of at least one of the enclosure or the external environment ranges from 2% to 50% over a temperature range of 0° C. to 100° C. In some embodiments, the equilibrium relative humidity of at least one of the enclosure or the external environment ranges from 2% to 25% over a temperature range of 0° C. to 100° C. In some embodiments, the equilibrium relative humidity of at least one of the enclosure or the external environment ranges from 2% to 10% over a temperature range of 0° C. to 100° C. In some embodiments, the equilibrium relative humidity of at least one of the enclosure or the external environment ranges from 2% to 5% over a temperature range of 0° C. to 100° C.

In some embodiments, the equilibrium relative humidity of at least one of the enclosure or the external environment ranges from 5% to 90% over a temperature range of 0° C. to 100° C. In some embodiments, the equilibrium relative humidity of at least one of the enclosure or the external environment ranges from 10% to 75% over a temperature range of 0° C. to 100° C. In some embodiments, the equilibrium relative humidity of at least one of the enclosure or the external environment ranges from 25% to 50% over a temperature range of 0° C. to 100° C.

In some embodiments, the equilibrium relative humidity of at least one of the enclosure or the external environment ranges from 2% to 98% over a temperature range of 0° C. to 75° C. In some embodiments, the equilibrium relative humidity of at least one of the enclosure or the external environment ranges from 2% to 98% over a temperature range of 0° C. to 50° C. In some embodiments, the equilibrium relative humidity of at least one of the enclosure or the external environment ranges from 2% to 98% over a temperature range of 0° C. to 25° C.

In some embodiments, the equilibrium relative humidity of at least one of the enclosure or the external environment ranges from 2% to 98% over a temperature range of 25° C. to 100° C. In some embodiments, the equilibrium relative humidity of at least one of the enclosure or the external environment ranges from 2% to 98% over a temperature range of 50° C. to 100° C. In some embodiments, the equilibrium relative humidity of at least one of the enclosure or the external environment ranges from 2% to 98% over a temperature range of 75° C. to 100° C.

In some embodiments, the equilibrium relative humidity of at least one of the enclosure or the external environment ranges from 2% to 98% over a temperature range of 25° C. to 50° C. In some embodiments, the equilibrium relative humidity of at least one of the enclosure or the external environment ranges from 2% to 98% over a temperature range of 25° C. to 75° C. In some embodiments, the equilibrium relative humidity of at least one of the enclosure or the external environment ranges from 2% to 98% over a temperature range of 50° C. to 75° C.

In some embodiments, the method is performed at a constant moisture gradient between the enclosure and the external environment. In some embodiments, the method is performed in intervals at a series of constant moisture gradients between the enclosure and the external environment. In some embodiments, a plurality of pump curves is generated during the intervals. In some embodiments, each pump curve corresponds to a particular moisture gradient of the series of moisture gradients.

In some embodiments, the constant moisture gradient or series of constant moisture gradients is constant over a range of from 0° C. to 100° C. In some embodiments, the constant moisture gradient or series of constant moisture gradients is constant over a range of from 25° C. to 100° C. In some embodiments, the constant moisture gradient or series of constant moisture gradients is constant over a range of from 50° C. to 100° C. In some embodiments, the constant moisture gradient or series of constant moisture gradients is constant over a range of from 75° C. to 100° C.

In some embodiments, the constant moisture gradient or series of constant moisture gradients is constant over a range of from 0° C. to 75° C. In some embodiments, the constant moisture gradient or series of constant moisture gradients is constant over a range of from 0° C. to 50° C. In some embodiments, the constant moisture gradient or series of constant moisture gradients is constant over a range of from 0° C. to 25° C.

In some embodiments, the constant moisture gradient or series of constant moisture gradients is constant over a range of from 25° C. to 75° C. In some embodiments, the constant moisture gradient or series of constant moisture gradients is constant over a range of from 50° C. to 75° C. In some embodiments, the constant moisture gradient or series of constant moisture gradients is constant over a range of from 25° C. to 50° C.

In some embodiments, where the external environment takes the form of a second enclosure, the second enclosure may have any constant moisture gradient or series of constant moisture gradients described herein over any temperature range described herein.

In some embodiments, the vapor pump operates continuously. In some embodiments, the vapor pump operates in cycles.

In some embodiments where the at least one vapor includes water vapor, at least a portion of the water vapor may be transferred, with the moisture pump, from the enclosure to the external environment over at least one first time-period by absorbing or adsorbing the portion of water vapor with the moisture pump from within the enclosure, so as to lower the relative humidity of the enclosure below the equilibrium relative humidity. In some embodiments, over the at least one first time-period, water may be evaporated from the supersaturated salt solution, so as to restore the relative humidity to the equilibrium relative humidity.

The at least one first time-period can be any length and may vary based on several factors. In some embodiments, the at least one first time-period ranges from 3 to 12 hours. In some embodiments, the at least one first time-period ranges from 5.5 to 12 hours. In some embodiments, the at least one first time-period ranges from 11.5 to 12 hours. In some embodiments, the at least one first time-period ranges from 3 to 5.5 hours. In some embodiments, the at least one first time-period ranges from 3 to 11.5 hours. In some embodiments, the at least one first time period ranges from 5.5 to 11.5 hours. In some embodiments, the at least one first time period is 3 hours. In some embodiments, the at least one first time period is 5.5 hours. In some embodiments, the at least one first time period is 11.5 hours. In some embodiments, the at least one first time period is 12 hours.

In some embodiments where the at least one vapor includes water vapor, at least a portion of the water vapor may be transferred, with the moisture pump, from the enclosure to the external environment over at least one second time-period.

The at least one second time-period can be any length and may vary based on several factors. In some embodiments, the at least one second time period ranges from 0.25 to 4 hrs. In some embodiments, the at least one second time period ranges from 0.5 to 4 hrs. In some embodiments, the at least one second time period ranges from 2 to 4 hrs. In some embodiments, the at least one second time period ranges from 0.25 to 2 hrs. In some embodiments, the at least one second time period ranges from 0.25 to 0.5 hrs. In some embodiments, the at least one second time period ranges from 0.5 to 2 hrs. In some embodiments, the at least one second time period is 0.25 hours. In some embodiments, the at least one second time period is 0.5 hours. In some embodiments, the at least one second time period is 2 hours. In some embodiments, the at least one second time period is 4 hours.

In some embodiments the transferring, with the moisture pump, of the at least a portion of the water vapor over the at least one second time-period may also include desorbing water vapor, from the moisture pump, into the external environment. In some embodiments, a sum of the at least one first time-period and the at least one second time-period defines a pump cycle. In some embodiments, the rate of the portion of water vapor transferred with the moisture pump from the enclosure to the external environment is calculated based on the change in mass of the supersaturated salt solution over the pump cycle.

In some embodiments, such as embodiments where the moisture pump operates continuously, the at least one first time-period and the at least one second time-period may overlap. In some embodiments, such as embodiments where the moisture pump operates continuously, the step of absorbing or adsorbing the portion of water vapor with the moisture pump from within the enclosure may overlap with the step of desorbing water vapor, from the moisture pump, into the external environment.

In some embodiments where the at least one vapor includes water vapor and where the external environment takes the form of a second enclosure, at least a portion of the water vapor may be transferred, with the moisture pump, from the first enclosure to the second enclosure over at least one first time-period by absorbing or adsorbing the portion of water vapor with the moisture pump from within the first enclosure, so as to lower the relative humidity of the first enclosure below the equilibrium relative humidity. In some embodiments, over the at least one first time-period, water may be evaporated from the supersaturated salt solution, so as to restore the relative humidity of the first enclosure to the equilibrium relative humidity. In some embodiments where the at least one vapor includes water vapor and where the external environment takes the form of a second enclosure, at least a portion of the water vapor may be transferred, with the moisture pump, from the first enclosure to the second enclosure over at least one second time-period. In some embodiments, the transferring, with the moisture pump, of the at least a portion of the water vapor over the at least one second time-period may also include desorbing water vapor from the moisture pump into the second enclosure. In some embodiments, a sum of the at least one first time-period and the at least one second time-period defines a pump cycle. In some embodiments, the rate of the portion of water vapor transferred, with the moisture pump, from the first enclosure to the second enclosure is calculated based on the change in mass of the supersaturated salt solution over the pump cycle.

In some embodiments, at least one pump curve is generated over the at least one time-period. A non-limiting procedure for generating at least one pump curve is described herein in Example 1. In some embodiments, the at least one pump curve described herein is generated over the pump cycle.

EXAMPLES

Example 1

The following is a non-limiting example illustrating the generation of at least one pump curve using a method according to the present disclosure.

Figure 2:
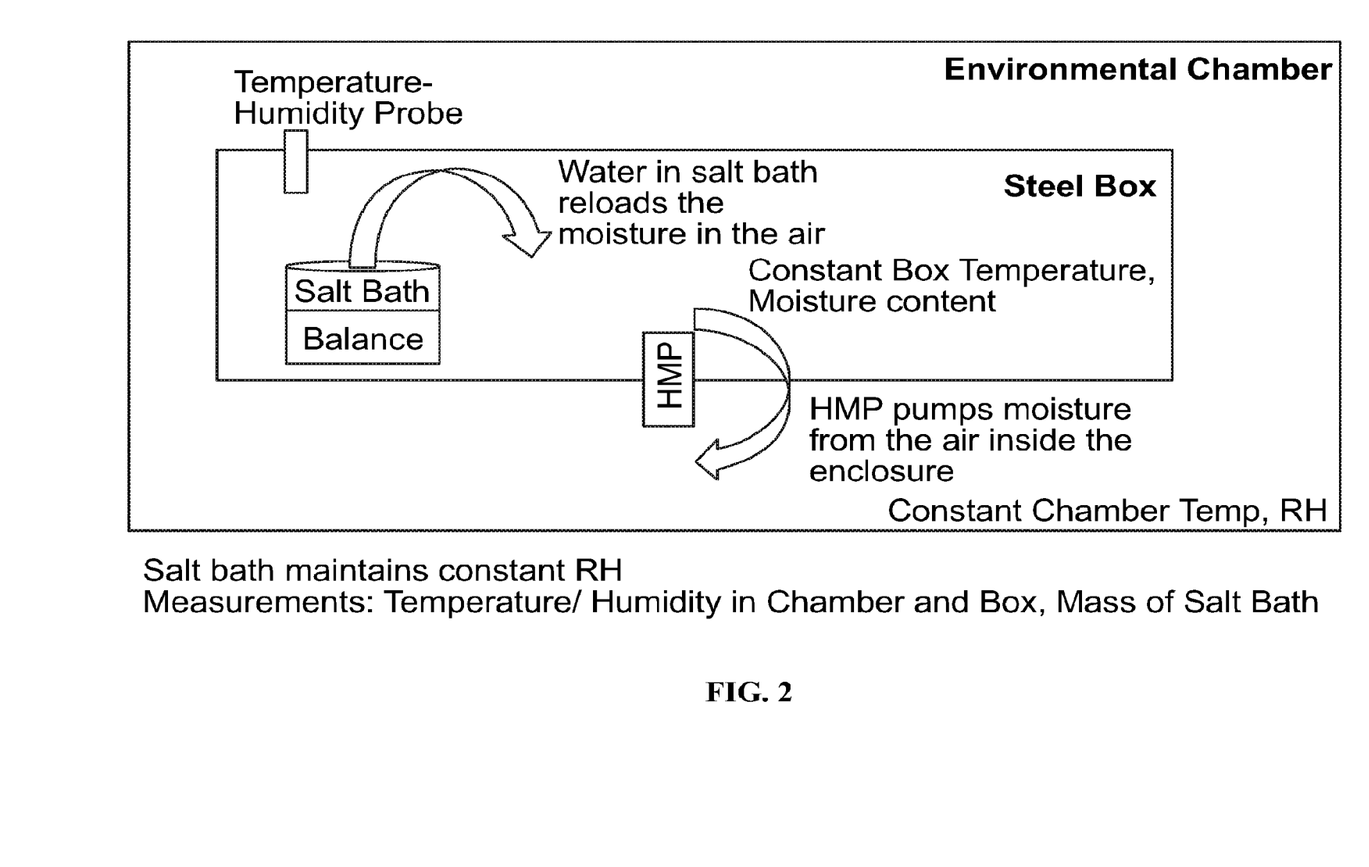
FIG. 2 depicts a non-limiting example of a test-set up according to the present disclosure.

As explained in further detail below, a test set-up as shown in FIG. 2 was assembled. As shown, the test set-up included an enclosure in the form of a steel box, a supersaturated salt bath, and a vapor pump in the form of a heated moisture pump (HMP). The external environment took the form of an environmental chamber. Moreover, in the present non-limiting example, the environmental chamber was maintained at a constant temperature and a constant relative humidity (RH).

A balance with data capture/logging capability was placed inside the enclosure, as shown in FIG. 2. The enclosure with balance was then loaded into an environmental chamber set at 35° C. and at 65% RH. All the access panels of the enclosure were opened so the inside of the enclosure was exposed to the chamber environment. A first humidity—temperature probe was connected to the interior of the enclosure through a sealed fitting to monitor the internal conditions of the enclosure. A second humidity—temperature probe was located inside the environmental chamber to monitor the chamber conditions. The temperature—humidity probes and the balance were connected to a data logger and data logging was started. In the present non-limiting example, the enclosure and the balance were allowed to soak in the chamber for 67 hours.

In the present non-limiting example, the supersaturated salt solution was provided in a sufficient amount so as to maintain a 65% RH at 35° C. and was mixed in a 14 cm diameter petri dish. After the 67-hour soak, the balance was zeroed and the petri dish was placed on the balance. All the enclosure access panels of the enclosure were closed creating a sealed environment. The environmental chamber continued to be set at 35° C. and 65% RH and data logging continued. The enclosure with the balance and supersaturated salt solution was allowed to equilibrate for 70 hours.

After the enclosure with the balance and supersaturated salt solution were at equilibrium, the HMP was installed into the enclosure such that the HMP was in fluid communication with the internal of the enclosure and the environmental chamber environment. All other access panels of the enclosure were closed creating a sealed internal environment. The HMP was connected to a power supply. The power supply was connected to a controller that cycled the power supply on and off according to the following 24 hour sequence:

2 hours ON
3 hours OFF
2 hours ON
3 hours OFF
2 hours ON
12 hours OFF

The mass of the supersaturated salt bath was recorded. The environmental chamber continued to be set at 35° C. and 65% RH; data logging continued.

The cycling of the moisture pump was started. The cycling of the moisture pump continued for 5 days.

Figure 3:
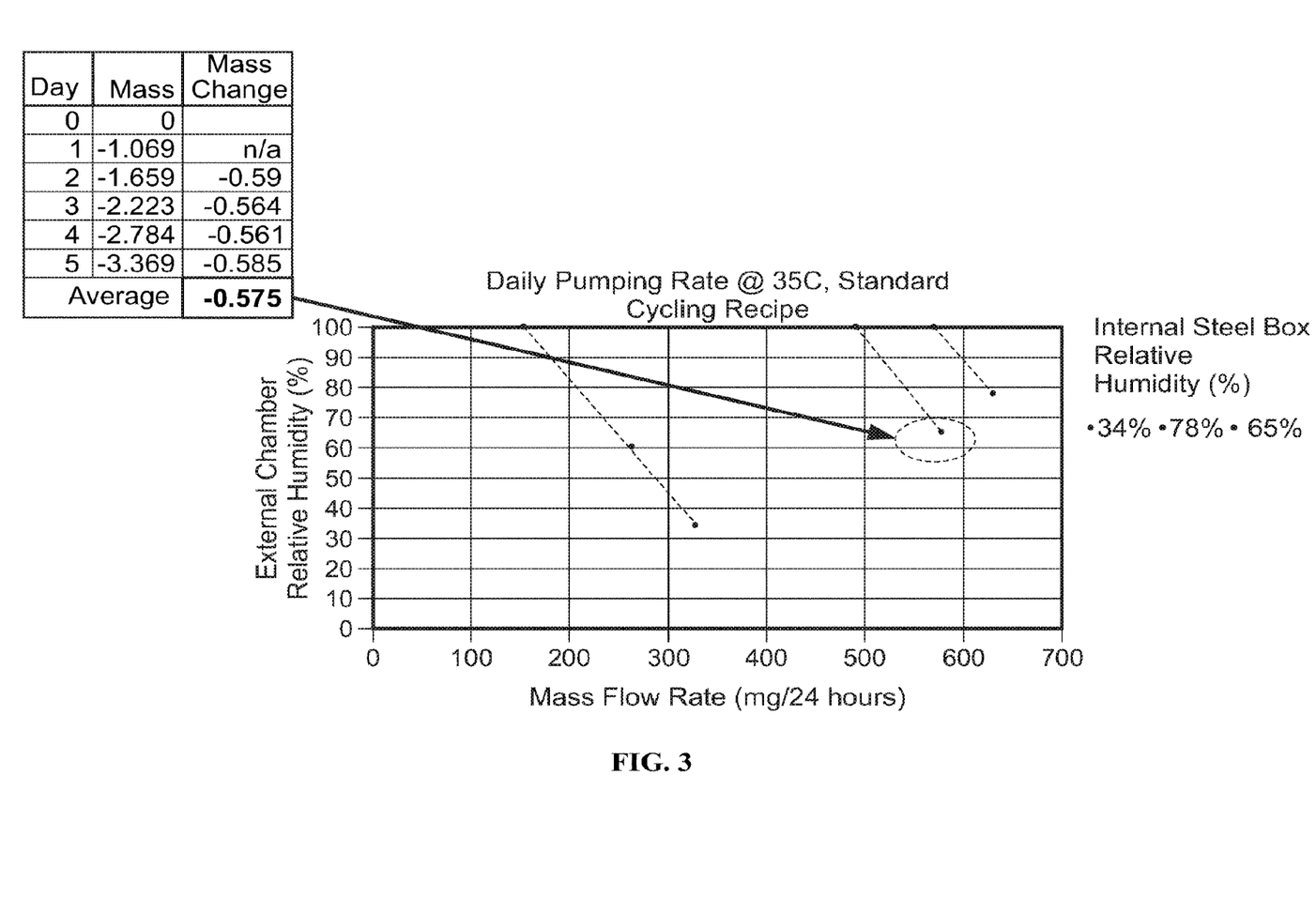
FIGS. 3 and 4 depict examples of pump curves according to some non-limiting embodiments.

After the moisture pump was operating for 5 days the test was stopped and the data was analyzed by plotting the mass of the supersaturated salt solution versus time as shown in FIG. 3. Then the change in the mass of the supersaturated salt solution was found for each 24 hour sequence. To account for the non-steady state conditions caused by the chamber door being opened to set-up and start the test, the data from the first 24 hour sequence was removed from the analysis. In this non-limiting example, the average change in mass of the supersaturated salt solution over the remaining four 24 hour sequences was calculated and resulted in an exemplary average moisture vapor pumping rate of 577 mg $H_2O$ per 24 hours. This average moisture vapor pumping rate is one point on the pump curve as shown in FIG. 3 where, at 35° C., the internal % RH is 65%, the external % RH is 65%; the moisture gradient between the enclosure internal environment and the external environment of the environmental chamber is 0% RH.

Figure 4:
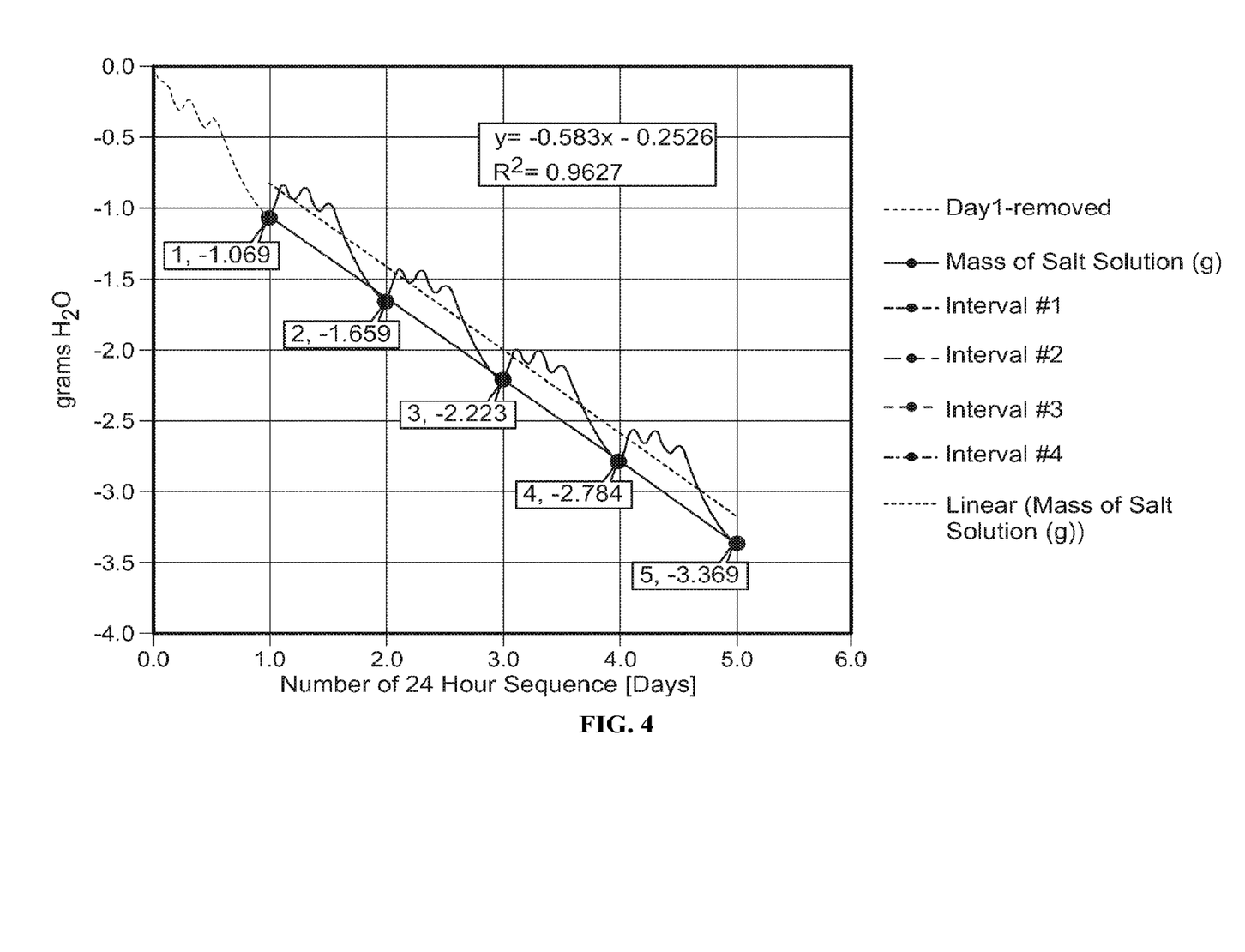

In some embodiments, (e.g., where mass of the supersaturated salt solution versus time data is highly linear), a linear least squares line can be fit to the data. The slope of the fitted line is then the average moisture vapor pumping rate, as shown in FIG. 4.

In some embodiments, this sequence of steps may be repeated for several combinations of internal and external temperature and humidity conditions to develop individual points of the pump curve.

Variations, modifications and alterations to the preferred embodiment of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, the several described embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method comprising:
    disposing a moisture pump partially within an enclosure, such that the moisture pump is in fluid communication with the enclosure and an external environment;
        wherein the enclosure comprises:
            water vapor; and
            a supersaturated salt solution;
        transferring, with the moisture pump, a portion of the water vapor from the enclosure to the external environment over at least one time-period;
        measuring a change in mass of the supersaturated salt solution over the at least one time-period; and
        calculating a rate of the portion of water vapor transferred, with the moisture pump, from the enclosure to the external environment over the at least one time-period;
            wherein the rate of water vapor transferred, with the moisture pump, from the enclosure to the external environment is calculated based on the change in mass of the supersaturated salt solution.

2. The method of claim 1, further comprising generating at least one pump curve over the at least one time-period.

3. The method of claim 1, wherein the method is performed at an equilibrium relative humidity in the enclosure and at a constant temperature.

4. The method of claim 1, wherein the method is performed at an equilibrium relative humidity in the external environment.

5. The method of claim 3, wherein the equilibrium relative humidity of at least one of the enclosure or the external environment ranges from 2% to 98% over a temperature range of 0° C. to 100° C.

6. The method of claim 1, wherein the moisture pump operates continuously.

7. The method of claim 1, wherein the moisture pump operates in cycles.

8. The method of claim 1, wherein the at least one time-period is a plurality of time periods comprising at least one first time-period and at least one second time period, wherein the step of transferring, with the moisture pump, the portion of the water vapor from the enclosure to the external environment over at least one time-period comprises:

for at least one first time-period:
absorbing or adsorbing the portion of water vapor with the moisture pump from within the enclosure, so as to lower the relative humidity of the enclosure below the equilibrium relative humidity, and
evaporating water, from the supersaturated salt solution, so as to restore the relative humidity to the equilibrium relative humidity; and for at least one second time-period:
desorbing water vapor, from the moisture pump, into the external environment;

wherein a sum of the at least one first and second time-periods defines a pump cycle.

9. The method of claim 8, wherein the rate of the portion of water vapor transferred with the moisture pump from the enclosure to the external environment is calculated based on the change in mass of the supersaturated salt solution over the at least one first time period, the at least one second time period, or any combination thereof.

10. The method of claim 9 further comprising generating at least one pump curve over the at least one first time period, the at least one second time period, or any combination thereof.

11. The method of claim 1, wherein the method is performed at a constant moisture gradient between the enclosure and the external environment.

12. The method of claim 1, wherein the method is performed in intervals at a series of constant moisture gradients between the enclosure and the external environment.

13. The method of claim 11, wherein the constant moisture gradient or series of constant moisture gradients is constant over a range of from 0° C. to 100° C.

14. The method of claim 1, wherein the external environment is in the form of a second enclosure, wherein the second enclosure is maintained at an equilibrium temperature.

15. The method of claim 1, wherein the at least one salt is chosen from: Lithium Bromide, Lithium Chloride, Potassium Carbonate, Potassium Nitrate, Potassium Sulfate, Calcium Chloride, Magnesium Chloride Hexahydrate, Magnesium Nitrate Hexahydrate, Sodium Nitrite, or any combination thereof.

16. The method of claim 1, wherein the at least one salt is chosen from: Magnesium Chloride, Cesium Fluoride, Lithium Bromide, Zinc Bromide, Potassium Hydroxide, Sodium Hydroxide, Lithium Chloride, Calcium Bromide Lithium Iodide, Potassium Acetate, Potassium Fluoride, Magnesium Chloride, Sodium Iodide, Potassium Carbonate, Magnesium Nitrate, Sodium Bromide, Cobalt Chloride, Potassium Iodide, Strontium Chloride, Sodium Nitrate, Sodium Chloride, Ammonium Chloride, Potassium Bromide, Ammonium Sulfate, Potassium Chloride, Strontium Nitrate, Potassium Nitrate, Potassium Sulfate, Potassium Chromate, Calcium Chloride, Magnesium Chloride Hexahydrate, Magnesium Nitrate Hexahydrate, Sodium Nitrite, or any combination thereof.

17. The method of claim 12, wherein a plurality of pump curves is generated during the intervals, wherein each pump curve corresponds to a particular moisture gradient of the series of moisture gradients.

* * * * *